(12) United States Patent
Kakuguchi

(10) Patent No.: US 7,203,513 B2
(45) Date of Patent: Apr. 10, 2007

(54) PORTABLE TERMINAL DEVICES

(75) Inventor: Kazuhiro Kakuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 55 days.

(21) Appl. No.: 11/086,564

(22) Filed: Mar. 23, 2005

(65) Prior Publication Data
US 2005/0164734 A1    Jul. 28, 2005

Related U.S. Application Data

(63) Continuation of application No. PCT/JP03/06417, filed on May 22, 2003.

(51) Int. Cl.
*H04M 1/00* (2006.01)

(52) U.S. Cl. .............. 455/550.1; 455/575.3; 455/575.1; 455/90.3; 455/347

(58) Field of Classification Search ............ 455/575.3, 455/575.1, 550.1, 90.1, 90.3, 347
See application file for complete search history.

(56) References Cited

U.S. PATENT DOCUMENTS

| 6,819,939 B2 | 11/2004 | Masamura | |
|---|---|---|---|
| 2002/0006809 A1* | 1/2002 | Kubo et al. | 455/550 |
| 2003/0036365 A1* | 2/2003 | Kuroda | 455/90 |

FOREIGN PATENT DOCUMENTS

| JP | 7-11076 | 2/1995 |
|---|---|---|
| JP | 9-93318 | 4/1997 |
| JP | 09-093318 | * 4/1997 |
| JP | 09093318 | * 4/1997 |
| JP | 2002-164997 | 6/2002 |
| JP | 2002-281135 | 9/2002 |

* cited by examiner

*Primary Examiner*—Erika A. Gary
*Assistant Examiner*—Khai Nguyen
(74) *Attorney, Agent, or Firm*—Arent Fox LLP

(57) ABSTRACT

The stationary body 12 comprises a plurality of operation keys 18 and two or more microphones 22 and 24. The movable body 16 comprises a receiver 34 and a liquid crystal image displaying surface 32, and is connected to the stationary body 12 by the hinge 14 so that the movable body 16 can be folded to the stationary body 12. The movable body 16 further comprises a structure 40 by which a user or others can recognize the presence of the microphones. The microphones 22 and 24 can be used for conversation purposes or for recording sound in stereo. The structure 40 capable of indicating the presence of two or more microphones can guide sound to the microphones. The structure 40 capable of indicating the presence of the microphones is constituted in such a manner that the user or others can see a hole provided on the wall above the microphone or a recess portion communicated with the hole.

9 Claims, 5 Drawing Sheets

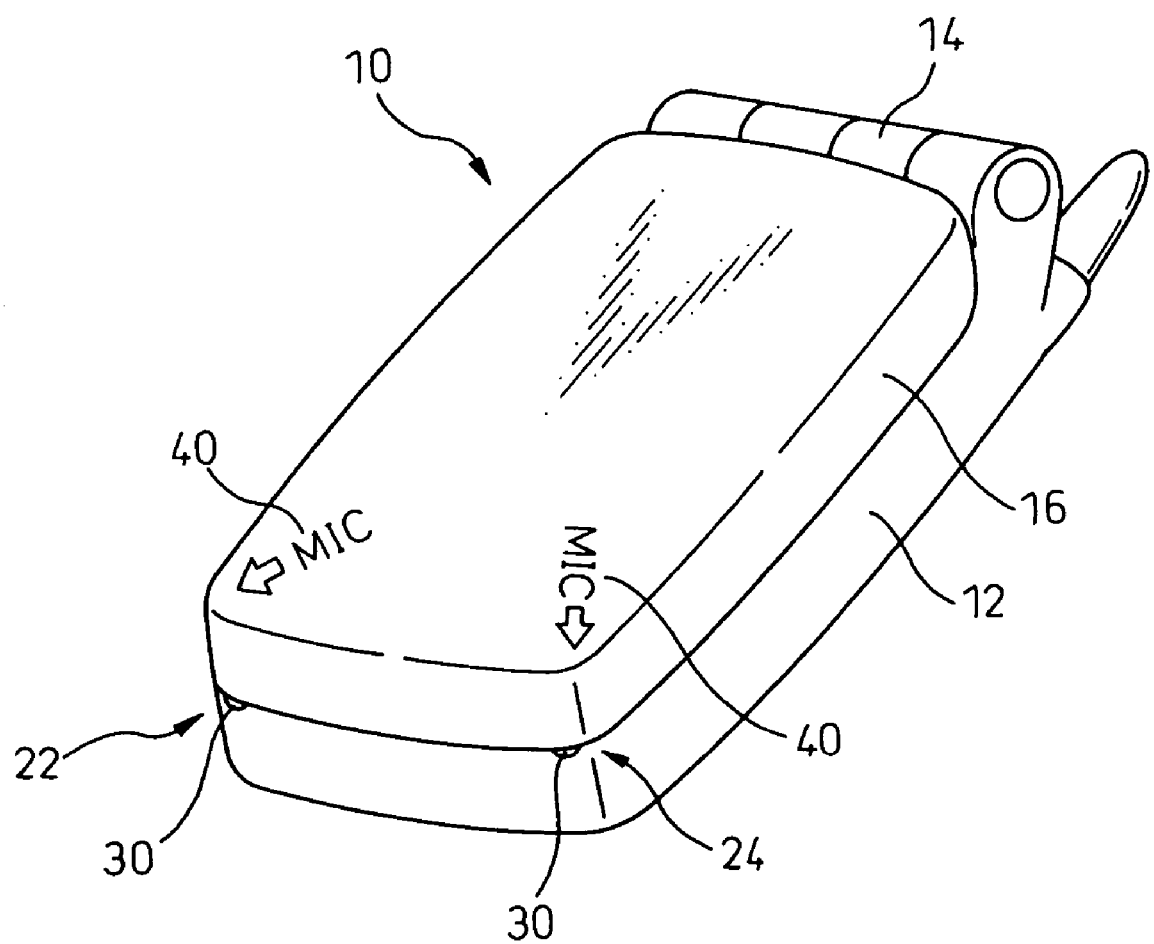

PORTABLE TERMINAL DEVICES

CROSS-REFERENCE TO RELATED APPLICATION

This application is a continuation application of PCT/JP03/06417, filed on May 22, 2003, the contents being incorporated herein by reference.

FIELD OF THE INVENTION

The present invention relates to a portable terminal device such as a cellular or a mobile phone.

BACKGROUND ART

In general, a cellular or mobile phone, used as a portable terminal device, comprises a stationary side body having operation keys and a microphone, and a movable body, having a liquid crystal image display surface and speaker, connected to the stationary side body by a hinge so that the movable body can be folded to the stationary side body. The cellular phone can be kept in the condition that the movable body is folded to the stationary body, while it can be used to talk over the phone under the condition that the movable body is open with respect to the stationary body.

Further, recently developed cellular phones have various functions. For example, JP-A (Japanese Unexamined Patent Publication)-2002-281135 discloses a cellular phone capable of recording and regenerating sound in stereo. Using this prior art phone, it is possible to talk over the phone with a microphone and speaker as in the usual conversation. Further, in the case of regenerating sound in stereo, the microphone is used as a speaker, and both the speaker which can also act as a microphone, and the original speaker, are used so as to realize a stereo sound regenerating mechanism.

JP-A-2002-164997 discloses a technique in which a device for realizing a hands-free mode is connected to a cellular phone and a plurality of microphones are used to talk over the phone between two or more persons. Further, JUM-A (Japanese Unexamined Utility Model Publication)-7-11076 discloses a cellular phone capable of using a headset.

Further, as a cellular phone provided with a camera has been introduced, it is possible to take a moving picture with the camera attached to the cellular phone. Moreover, there is suggested a cellular phone provided with a recording mechanism. However, in the conventional cellular phone provided with the recording mechanism, since recording in monaural is carried out with a microphone designed for conversation recording, it was impossible to record sound in stereo with the microphone of the cellular phone.

DISCLOSURE OF THE INVENTION

An object of the present invention is to provide a portable terminal device capable of recording sound in stereo with two or more microphones.

The portable terminal device according to present invention is characterized by comprising a first body having two or more microphones and a second body having a structure by which a user or others can recognize the presence of the microphones in the first body, the second body being connected to the first body by a hinge so that the second body can be folded to the first body, wherein the structure capable of indicating the presence of the microphones in the first body comprises a recess portion or hole provided in the second body so that sound can be guided to each of the microphones.

In the above constitution, two or more microphones can be provided in a foldable portable terminal device so that a user can converse through the microphones and, further, the user can record sound in stereo using the microphones. Furthermore, as the terminal device has a structure by which the user or others can recognize that two or more microphones are contained in the terminal device, it becomes possible to visually recognize the presence of the microphones, thereby allowing sound recording in stereo. The structure indicating the presence of the microphones is designed and set so that the user or others can recognize the presence of the microphones in the first body when the second body is folded to the first body.

BRIEF EXPLANATION OF THE DRAWINGS

FIG. 9 is a perspective view showing a cellular phone according to still another embodiment of the present invention.

BEST MODE FOR CARRYING OUT THE INVENTION

Figure 1:
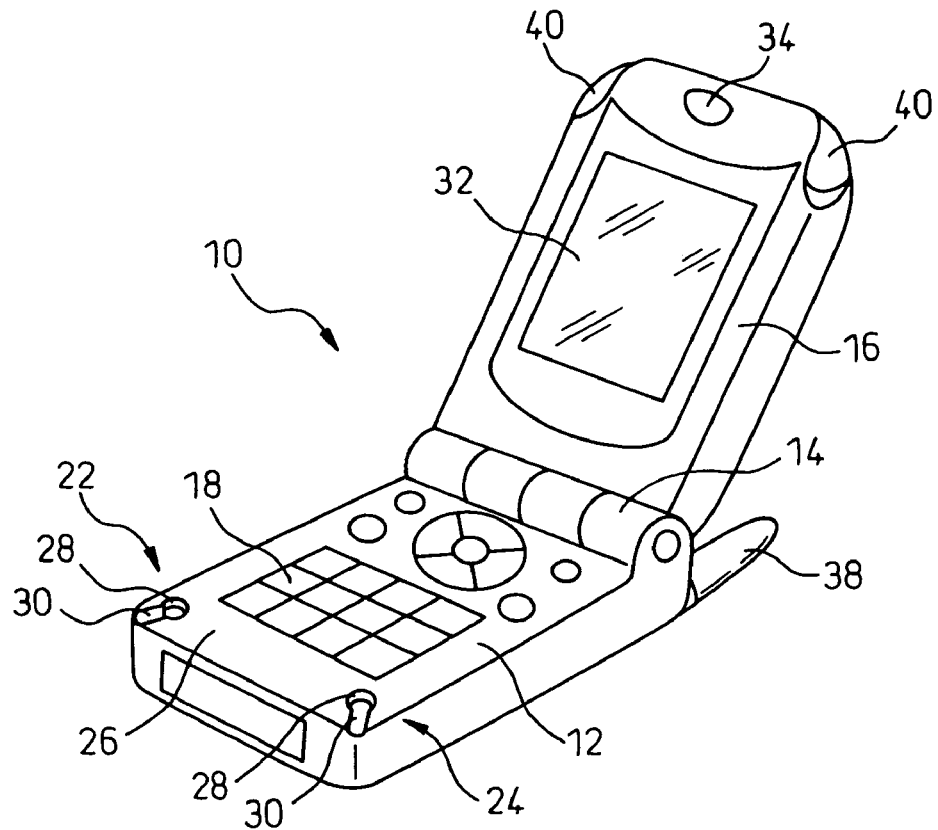
FIG. 1 is a perspective view showing a cellular or mobile phone, which is illustrated in an open state, according to an embodiment of the present invention.
Figure 2:
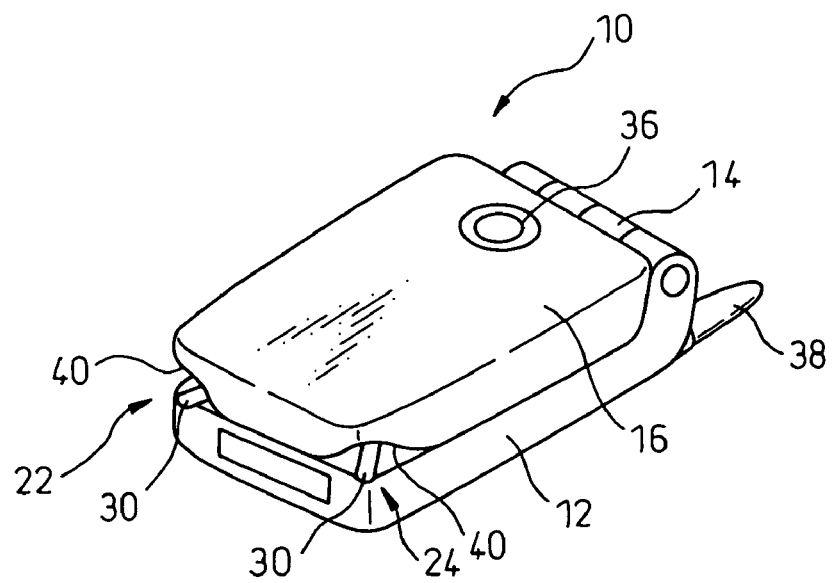
FIG. 2 is a perspective view showing the cellular phone of FIG. 1 which is illustrated in a folded state.

FIG. 1 is a perspective view showing a cellular or mobile phone in an open state according to an embodiment of the present invention. FIG. 2 is a perspective view showing the cellular phone of FIG. 1 in a folded state. In FIGS. 1 and 2, the cellular phone 10 comprises a stationary body (first body) 12 and a movable body (second body) 16 connected to the stationary body 12 by a hinge 14 so that the movable body 16 can be folded against the stationary body 12. The cellular phone 10 can be used or stored under the condition that the movable body 16 is folded to the stationary body 12, and it can be used under the condition that the movable body 16 is opened from the stationary body 12. The movable body 16 is formed into such a configuration that the movable body 16 can cover substantially the entire stationary body 12 under the condition that the movable body 16 is folded to the stationary body 12.

The stationary body 12 comprises a plurality of operation keys 18 and two or more microphones 22 and 24 in an inner surface side of the stationary body 12. The microphones 22 and 24 are composed of two microphones 22 and 24 arranged at both end portions of one side of the stationary body 12, which side is far from the hinge 14. That is, the microphones 22 and 24 are arranged in the corner portions or in the positions adjacent to the corner portions on the forward end side of the stationary body 12.

Figure 3:
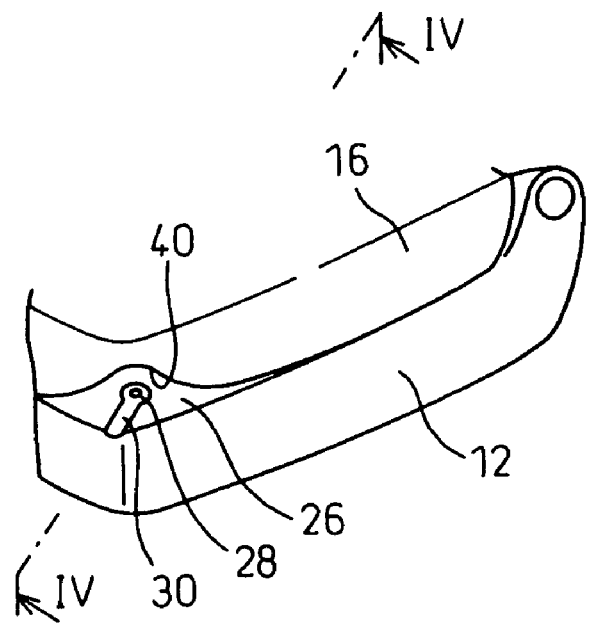
FIG. 3 is an enlarged perspective view showing a portion of the cellular phone of FIG. 2.
Figure 4:
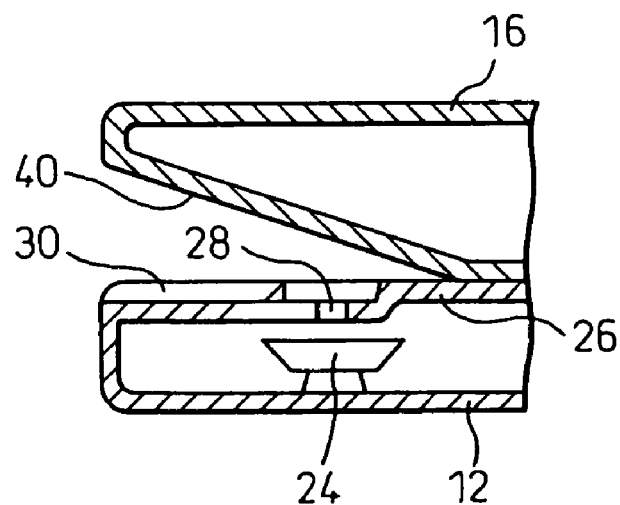
FIG. 4 is a cross-sectional view showing the cellular phone of FIG. 3 taken along line IV—IV in FIG. 3.

FIG. 3 is an enlarged perspective view showing a portion of the cellular phone of FIG. 2. FIG. 4 is a sectional view showing the cellular phone of FIG. 3 taken along line IV—IV of FIG. 3. In FIG. 4, one microphone 24 is arranged inside the stationary body 12. Another microphone 22 is also arranged inside the stationary body 12 in the same manner as that of the microphone 24 shown in FIG. 4.

The microphones 22 and 24 are covered with the upper wall 26 of the stationary body 12. The upper wall 26 of the stationary body 12 comprises a hole 28 and a recess portion 30 communicated with the hole 28 for guiding sound from the outside of the cellular phone to microphones 22 and 24. The recess portion 30 has a structure such that a portion of the upper wall 26 of the stationary body 12 is linearly removed in the direction of the thickness. The holes 28 are each located just above microphones 22 and 24. The recess portion 30 extends from the hole 28 toward the corner portion of the stationary body 12, and is opened at the end of the stationary body 12 to form an opening in the form of a substantial semicircle. The end portion of the recess portion 30 can be seen by a user or others even when the movable body 16 is folded to the stationary body 12. Note that the recess portion 30 may be omitted and only the holes 28 may exist.

The movable body 16 comprises a liquid crystal image surface 32 and a receiver 34 arranged in an inner surface side of the movable body 16, and a camera arranged in an outside surface of the movable body 16. The movable body 16 further comprises an antenna 38.

Further, as shown in FIGS. 1 to 4, the movable body 16 comprises a structure 40 by which a user or others can recognize that microphones 22 and 24 are arranged in the stationary body 12. The each structure 40 is provided at a position corresponding to each of the microphones 22 and 24. That is, the structure 40 indicating the presence of the microphones 22 and 24 is arranged in a position above the hole 28 on the upper wall 26 and the recess portion 30 of the stationary body 12 in the both end portions on the forward end side of the movable body 16 in such a manner that the structure 40 overlaps the hole 28 and the recess portion 30.

The structure 40 used for recognition of the presence of the microphones 22 and 24 is formed as a recess portion which is formed in such a manner that the corner portion on the side of the movable body 16 on the forward end side is partially obliquely cut away from the side of the movable body 16 to the lower face (the lower face of the movable body 16 under the condition that the movable body 16 is folded). Accordingly, under the condition that the movable body 16 is folded against the stationary body 12, the movable body 16 covers the microphones 22 and 24, the hole 28 of the upper wall 26 of the stationary body 12 and the recess portion 30, while the hole 28 of the upper wall 26 of the stationary body 12 and the recess portion 30 can be seen by the user or others, from the outside of the phone, through the structure 40.

The recess portion composing the structure 40 is larger than the recess portion 30 formed in the upper wall 26 of the stationary body 12. The recess portion composing the structure 40 comprises an opening, which spreads out in a fan-shape inclining from the upper end portion toward the lower portion and the bottom portion of this fan-shaped opening is fairly large. Accordingly, it seems that the opening itself is a microphone, and thus the opening can indicate the presence of a microphone.

As described above, the structure 40, by which the user or others can recognize the presence of the microphones 22 and 24, is constituted so that the user or others can visually recognize the presence of the microphones under the condition that the movable body 16 is folded to the stationary body 12. Further, the structure 40, by which the user or others can recognize the presence of the microphones 22 and 24, to assist in stereo recording under the condition that the movable body 16 is folded to the stationary body 12, is constituted so that sound can be guided from the outside of the phone to the microphones 22 and 24.

An inner portion of the cellular phone 10 contains a function or means of recording sound in stereo (not shown). Accordingly, the user can talk over the phone with the microphones 22 and 24 (or one of the microphones 22 and 24) and the receiver, and also record sound in stereo with the microphones 22 and 24. In this case, as the structure 40 capable of indicating the presence of the microphones 22 and 24 is contained in the cellular phone, the user can visually recognize the presence of the microphones 22 and 24, thereby enabling the user to positively conduct sound recording in stereo.

Figure 5:
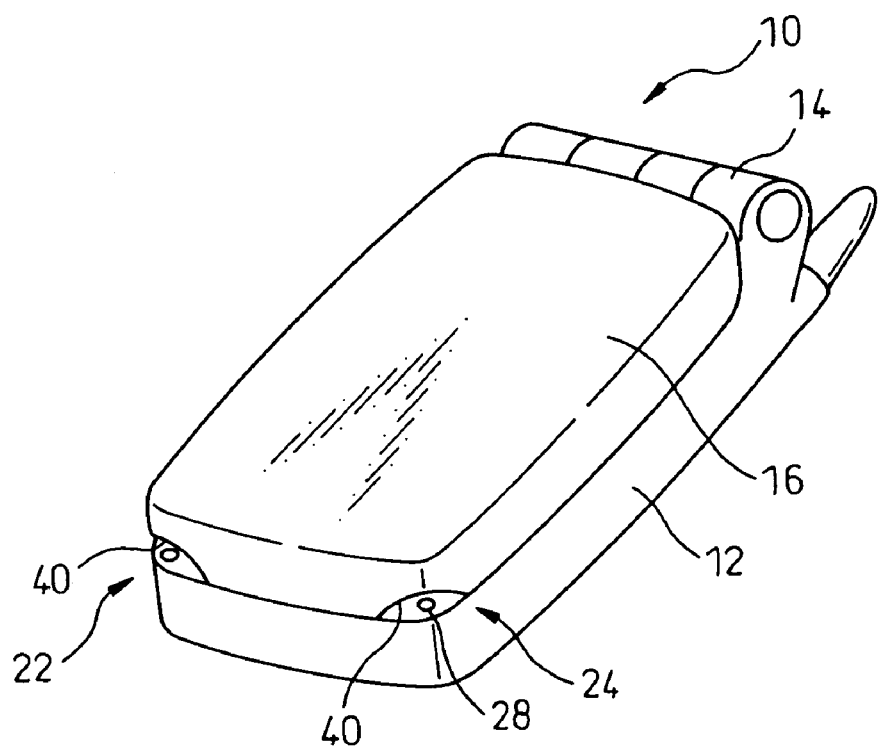
FIG. 5 is a perspective view showing a cellular phone according to another embodiment of the present invention.
Figure 6:
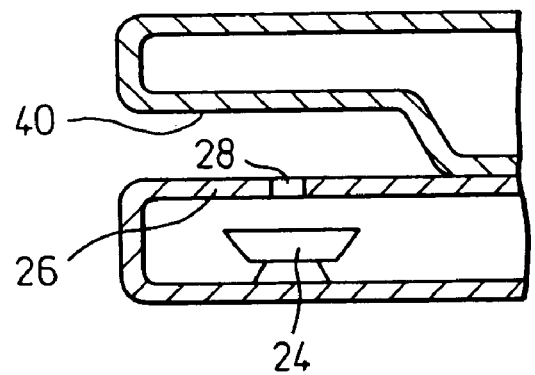
FIG. 6 is a cross-sectional view showing a portion of FIG. 5.

FIG. 5 is a perspective view showing a cellular phone according to another embodiment of the present invention. FIG. 6 is a cross-sectional view showing a portion of the cellular phone of FIG. 5. In FIGS. 5 and 6, as in other drawings referred to above, the cellular phone 10 comprises a stationary body (first body) 12 and a movable body (second body) 16 connected to the stationary body 12 in such a manner that the movable body 16 can be folded by the hinge 14 against the stationary body 12. The stationary body 12 has two microphones 22 and 24 attached to both end portions on one side which is far from the hinge 14 of the stationary body 12. That is, the two microphones 22 and 24 are provided in the corner portion on the forward end side of the stationary body 12 or in the neighborhood of the corner portion. The microphones 22 and 24 are arranged inside the stationary body 12 and covered with the upper wall 26 of the stationary body 12. The upper wall 26 of the stationary body 12 has holes 28 by which sound is guided from the outside of the phone to the microphones 22 and 24.

The movable body 16 has a structure 40 which makes the user recognize that the microphones 22 and 24 are contained in the stationary body 12. The structure 40 enabling the user to recognize the presence of the microphones 22 and 24 is provided at a position corresponding to each of the microphones 22 and 24. The structure 40, to allow the user recognize that the microphones 22 and 24 are arranged, is formed as a recess portion as in the embodiments described above. In this case, the structure 40 is constituted so that sound can be guided from the outside to the microphones 22 and 24 under the condition that the movable body 16 is folded to the stationary body 12. The hole 28 can be seen from the outside through the structure 40.

Figure 7:
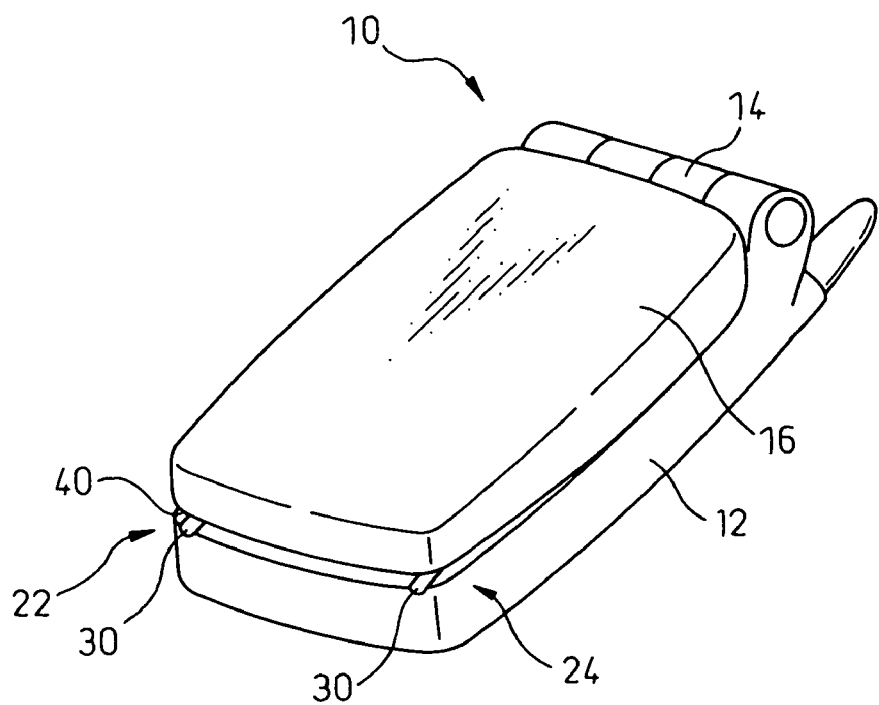
FIG. 7 is a perspective view showing a cellular phone according to another embodiment of the present invention.

FIG. 7 is a perspective view showing a cellular phone according to another embodiment of the present invention. In FIG. 7, the cellular phone 10 comprises a stationary body (first body) 12 and a movable body (second body) 16 connected to the stationary body 12 in such a manner that the movable body 16 can be folded by the hinge 14 against the stationary body 12. The stationary body 12 comprises two microphones 22 and 24 attached to both end portions on one side which is far from the hinge 14 of the stationary body 12. The upper wall 26 of the stationary body 12 comprises a hole 28 and a recess portion 30 communicated with each hole 28 for guiding sound from the outside to each of the microphones 22 and 24 (see, FIG. 4).

The movable body 16 has a structure 40 which allows the user or others recognize that the microphones 22 and 24 are contained in the stationary body 12. The structure 40 enabling the user to recognize the presence of the microphones 22 and 24 is formed as a recess portion in which the lower face of the forward end portion of the movable body 16 is continuously cut away. In this case, the structure 40 enabling the user to recognize the presence of the microphones 22 and 24 is constituted so that the recess portion 30 of the stationary body 12 can be seen by the user under the condition that the movable body 16 is folded with respect to the stationary body 12, and also so that sound can be guided from the outside to the microphones 22 and 24.

Figure 8:
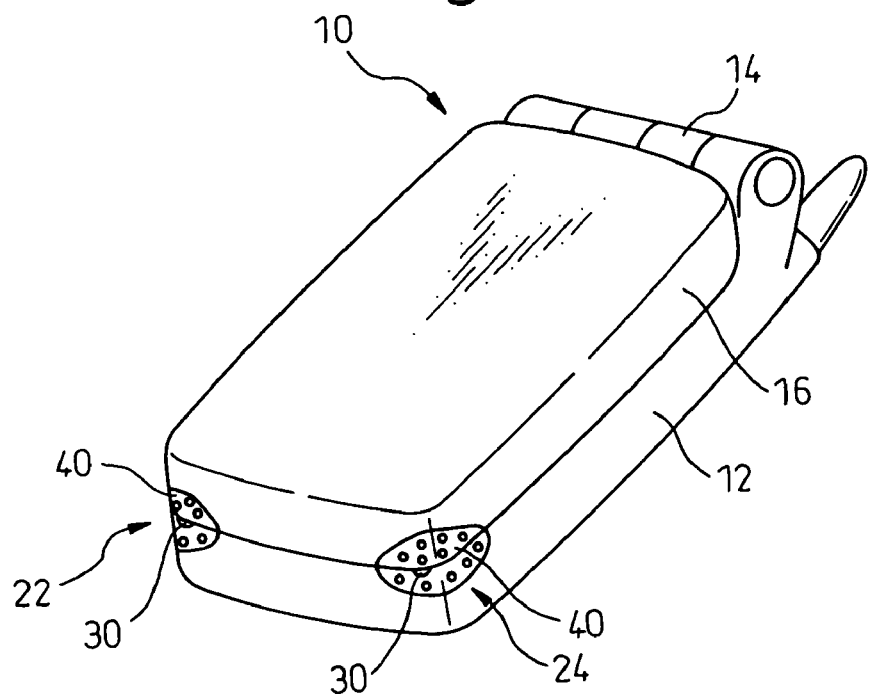
FIG. 8 is a perspective view showing a cellular phone according to still another embodiment of the present invention.

FIG. 8 is a perspective view showing a cellular phone according to another embodiment of the present invention. In FIG. 8, the cellular phone 10 comprises a stationary body (first body) 12 and a movable body (second body) 16 connected to the stationary body 12 in such a manner that the movable body 16 can be folded by the hinge 14 against the stationary body 12. The stationary body 12 comprises two microphones 22 and 24 attached to both end portions on one side which is far from the hinge 14 of the stationary body 12. The upper wall 26 of the stationary body 12 comprises a hole 28 and a recess portion 30 communicated with each hole 28 for guiding sound from the outside to each of the microphones 22 and 24 (see, FIG. 4).

The movable body 16 has a structure 40 which allows the user or others to recognize that the microphones 22 and 24 are contained in the stationary body 12. The structure 40 enabling the user to recognize the presence of the microphones 22 and 24 is formed as a region containing two or more of small holes provided in the corner portion on the forward end side of the movable body 16. Also, a region containing two or more small holes is provided in the corner portion on the forward end side of the stationary body 12. In some of the microphone structures, two or more small holes may be formed on the upper wall covering the microphones. Accordingly, the region containing the small holes at the corner portion on the forward end side of the movable body 16 will suggest that a microphone is contained in each region. As there are provided two regions in which the small holes are formed at the corner portion on the forward end side of the movable body 16, the user can visually recognize that sound can be recorded in stereo by this cellular phone.

FIG. 9 is a perspective view showing a cellular phone according to another embodiment of the present invention. In FIG. 9, the cellular phone 10 comprises a stationary body (first body) 12 and a movable body (second body) 16 connected to the stationary body 12 in such a manner that the movable body 16 can be folded by the hinge 14 against the stationary body 12. The stationary body 12 comprises two microphones 22 and 24 attached to both end portions on one side which is far from the hinge 14 of the stationary body 12. The upper wall 26 of the stationary body 12 comprises a hole 28 to guide sound from the outside to the microphones 22 and 24, and a recess portion 30 communicated with the hole 28 (see, FIG. 4).

The movable body 16 has a structure 40 which makes the user or others recognize that the microphones 22 and 24 are contained in the stationary body 12. The structure 40 enabling the user to recognize the presence of the microphones 22 and 24 is formed as an indication or marking provided on the upper face of the corner portion on the forward end side of the movable body 16. In this case, the indication directly indicates that two microphones 22 and 24 are contained in the device.

As explained above, according to the present invention, as two or more microphones are provided and, further, the structure indicating the presence of the microphones is provided, it becomes possible for the user to positively make sound recordings in stereo.

The invention claimed is:

1. A portable terminal device comprising a first body having two or more microphones in corner portions or in portions adjacent to the corner portions on a forward end side thereof and a second body, having a structure capable of indicating the presence of two or more microphones in the first body, connected to the first body by a hinge so that the second body can be folded against the first body, the second body comprising a receiver, wherein the two or more microphones of the first body and the receiver of the second body are located so as to be free from overlapping each other when the second body is folded against the first body, and the structure capable of indicating the presence of two or more microphones in the first body comprises a recess portion or hole provided in the second body so that sound can be guided to each of the microphones, and the presence of the recess portion or hole is recognizable when the second body is folded against the first body.

2. A portable terminal device according to claim 1, wherein the microphones comprise two microphones arranged at both end portions on one side of the first body which is far from the hinge.

3. A portable terminal device according to claim 1, wherein the second body covers the two or more microphones under the condition that the second body is folded to the first body, and the recess portion or hole in the second body is constituted so that a user or others can recognize the presence of the microphones under the condition that the second body is folded to the first body.

4. A portable terminal device according to claim 3, wherein the recess portion or hole in the second body is located at a position corresponding to each of the microphones.

5. A portable terminal device according to claim 3, wherein the first body comprises a wall covering each microphone, the wall has a hole capable of guiding sound from the outside to each microphone, and the structure capable of indicating the presence of the microphones comprises a recess portion through which the user or others can see the hole from the outside of the device under the condition that the second body is folded to the first body.

6. A portable terminal device according to claim 3, wherein the second body comprises a wall covering each microphone, the wall has a hole and a recess portion, communicated to the hole, capable of guiding sound from the outside of the device to each microphone, and the structure capable of indicating the presence of the microphones comprises a recess portion through which the user or others can see the recess portion from the outside of the device under the condition that the second body is folded to the first body.

7. A portable terminal device according to claim 1, wherein the second body further comprises an image displaying surface.

8. A portable terminal device according to claim 1, wherein the second body further comprises a camera.

9. A portable terminal device according to claim 1, wherein the first body further comprises a plurality of operation keys.

* * * * *